United States Patent [19]

Murakami et al.

[11] Patent Number: 4,885,147

[45] Date of Patent: Dec. 5, 1989

[54] PROCESS FOR PREPARING A LARGE-GRAINED UO$_2$ FUEL

[75] Inventors: Hirohiko Murakami, Mito; Toru Ogawa, Hidachi; Kousaku Fukuda, Mito, all of Japan

[73] Assignee: Japan Atomic Energy Research Institute, Tokyo, Japan

[21] Appl. No.: 270,640

[22] Filed: Nov. 14, 1988

[30] Foreign Application Priority Data

Nov. 12, 1987 [JP] Japan .............................. 62-284190

[51] Int. Cl.$^4$ .................. C01G 43/025; C01G 43/01; G21G 4/00; C09K 11/04
[52] U.S. Cl. .................................. 423/261; 252/636; 252/643; 264/0.5; 423/260
[58] Field of Search ............ 252/643, 636, 637; 264/0.5; 423/253, 251, 254, 258, 260, 261

[56] References Cited

U.S. PATENT DOCUMENTS

| | | | |
|---|---|---|---|
| 3,872,022 | 3/1975 | DeHollander et al. | 423/261 |
| 3,883,623 | 5/1975 | Lay | 264/0.5 |
| 3,930,787 | 1/1976 | DeHollander et al. | 264/0.5 |
| 3,953,286 | 4/1976 | Watson et al. | 264/0.5 |
| 3,998,925 | 12/1976 | Fuller | 423/261 |
| 4,079,120 | 3/1978 | Cole et al. | 423/261 |
| 4,090,976 | 5/1978 | DeHollander et al. | 423/261 |
| 4,120,936 | 10/1978 | DeLuca et al. | 423/261 |
| 4,234,550 | 11/1980 | DeHollander | 423/261 |
| 4,264,540 | 4/1981 | Butler | 264/0.5 |
| 4,505,882 | 3/1985 | Hasegawa et al. | 423/261 |
| 4,666,691 | 5/1987 | Hasegawa | 423/260 |
| 4,687,601 | 8/1987 | Bachelard et al. | 252/638 |
| 4,788,048 | 11/1988 | Tanaka et al. | 423/261 |

*Primary Examiner*—Howard J. Locker
*Attorney, Agent, or Firm*—Oblon, Spivak, McClelland, Maier & Neustadt

[57] ABSTRACT

A process for producing large-grain, low-density UO$_2$ micro-fuel spheres, the micro-fuel spheres having an average grain diameter of at least 5 $\mu$m, which comprises:

(a) isothermally heating one or more UO$_2$ micro-fuel spheres in a stream consisting essentially of carbon dioxide for a time and at a temperature sufficient to produce grains having an increased average grain diameter of greater than 5 $\mu$m, without substantially increasing the density of said micro-fuel spheres; and then (b) sintering said produced grains, in the absence of a sintering additive, in a reducing gas stream for a time and at a temperature sufficient to regulate both the ratio of oxygen to uranium in the produced grains, and the density of the grains.

9 Claims, 2 Drawing Sheets

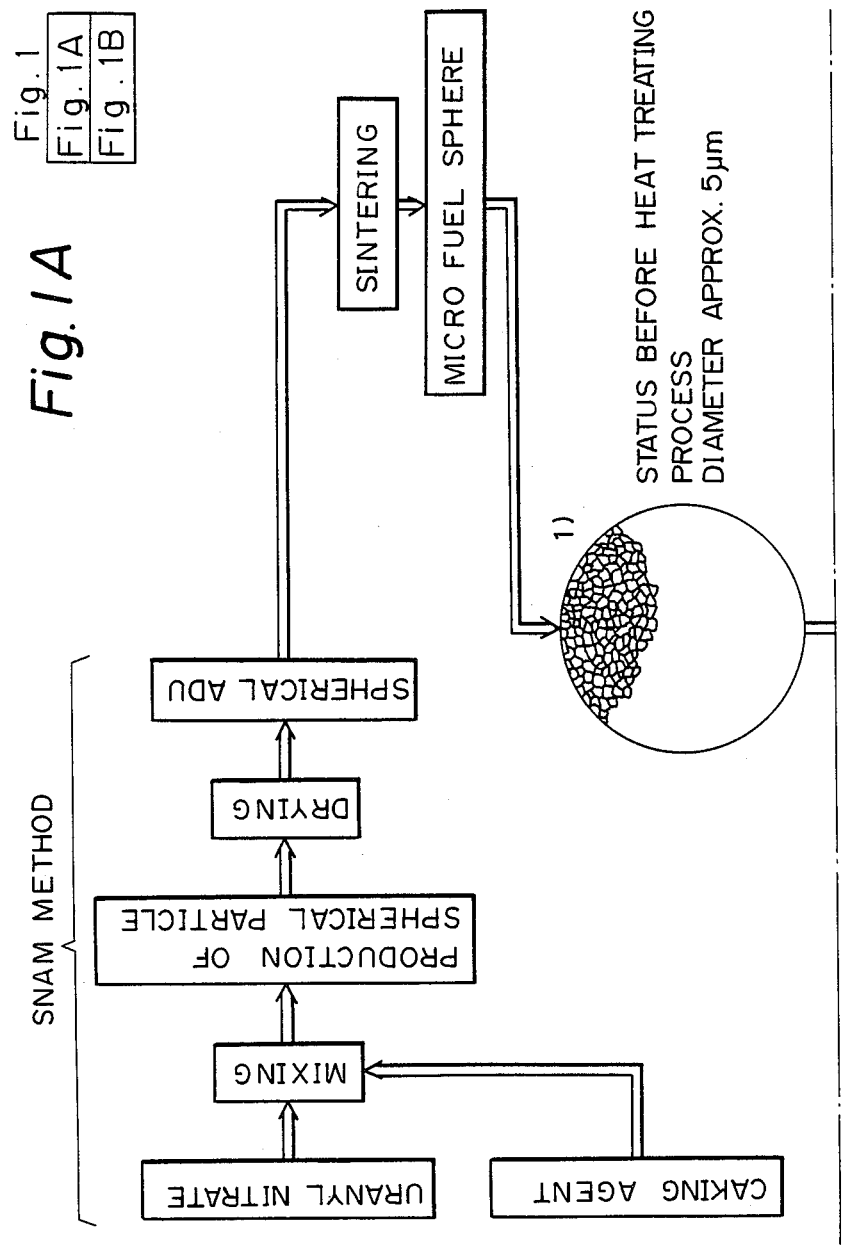

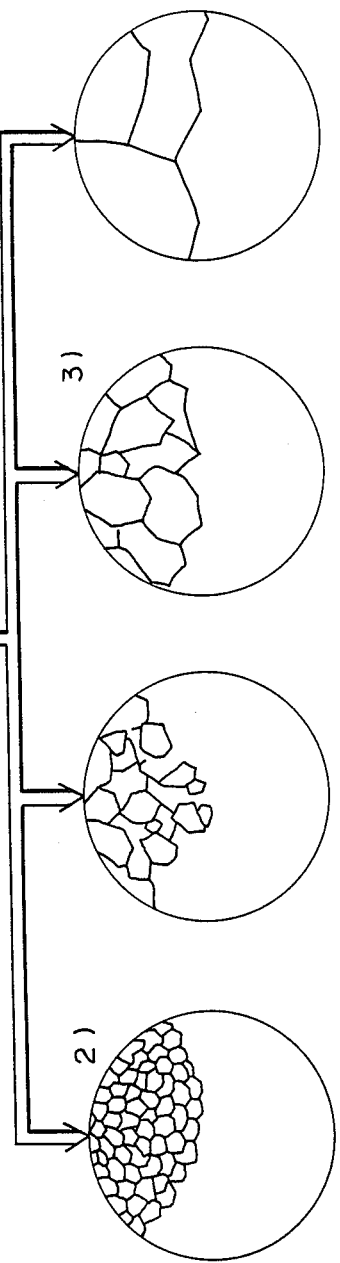

PROCESS FOR PREPARING A LARGE-GRAINED UO₂ FUEL

BACKGROUND OF THE INVENTION

1. Field of the Invention

The present invention relates to a process for preparing a large grained $UO_2$ fuel.

More particularly, the present invention relates to a novel process for preparing a large-grained $UO_2$ fuel without using any additives.

2. Description of the Prior Art

The conventional process for preparing a large-grained fuel has been performed only by using a pellet of $UO_2$ fuel for light-water type power reactor and the process is classified broadly into the following three methods:

[Method 1] Extended annealing under reducing conditions at temperatures similar to those used during fuel manufacture (about 1700° C.);

[Method 2] Ultra-high temperature sintering (about 2000° C.); and

[Method 3] Use of additives as $Cr_2O_3$, $TiO_2$, $Nb_2O_5$, $MgO$, etc.

However, in Method 1, a long time (100–200 hours) of sintering is necessary for making the grain diameter grow to a size of 35 $\mu$m by sintering at 1,700° C. in a reducing atmosphere.

In Method 2, grains can be produced with a diameter from 30 $\mu$m to 35 $\mu$m in a few hours. However, an ultra-high temperature furnace technology usable at a temperature of above 2,000° C. becomes a problem.

Thus, at the present time, Methods 1 and 2 cannot be put to economical and therefore, practical use.

In Method 3, a large-grained fuel can be easily obtained in a reasonably short-time by using chemical additives in $UO_2$ pellet. However, also in a this method, it is necessary to take the various influences of additives on the $UO_2$ fuel into consideration and its practical use is attended with much difficulty.

SUMMARY OF THE INVENTION

In accordance with the present invention, however, large-grained $UO_2$ fuel can be prepared without using any additives in the first process of formation of micro fuel spheres (200–600 $\mu$m in diameter) when coated-particle fuels for high-temperature gas-cooled reactor and sphere pack and spherical fuels for light-water type power reactor are produced by a process for preparing the large-grained $UO_2$ fuel.

BRIEF DESCRIPTION OF DRAWING

FIGS. 1A and 1B are flow charts for illustrating the process of the present invention, in which it is shown that the average grain diameter in particles obtained by SNAM method is approximately 5 $\mu$m and the grain diameter is increased by heat treatment according to the process of the present invention.

DETAILED DESCRIPTION OF THE PREFERRED EMBODIMENT

The present invention relates to a novel process for preparing a large-grained $UO_2$ fuel, which is different from the additive-adding method, as mentioned above. More particularly, the present invention relates to a process for preparing a large-grained $UO_2$ fuel by isothermally heating a micro fuel sphere for high-temperature gas reactor obtained by any conventional method in a carbon dioxide stream to produce rapid growth of particles, and thereafter regulating the O/U ratioin a hydrogen stream.

The large-grained micro fuel sphere obtained by the process in the present invention can be utilized as a coated-particle fuel for high-temperature gas-cooled reactors by coating the fuel sphere, and as a sphere pack fuel for light-water type power reactor prepared by vibration filling up the fuel sphere. And also, as an application example, it seems to be possible to compress this fuel sphere to a pellet to utilize it as a spherical fuel for light-water type power reactor.

According to the present invention, it has become possible to prepare a large-grained $UO_2$ fuel without adoption of any additives by sintering at a lower temperature for a shorter time in comparison with the prior art by using a micro fuel sphere in place of a pellet fuel used up to now and using carbon dioxide as a sintering atmosphere. The grain growth of $UO_2$ under an oxidizing atmosphere has been known heretofore and the test thereof has been held. However, in the prior test, an uniform grain growth was not obtained since a gradient of oxygen concentration occurs in a pellet because of using a pellet fuel. And, in a pellet fuel prepared by the powder method, an abnormal grain growth frequently occurs owing to the lack of uniformity of grain size and the influence of impurities. Therefore, in the preparation of $UO_2$ fuel, the sintering under an oxidizing atmosphere has been excluded from the beginning and during any sintering step.

The present invention, in contrast with this, effects the growth of $UO_2$ grain in an oxidizing atmosphere and, in which a micro fuel sphere has been used as a fuel in order to overcome such a defect as found in the pellet fuel. That is, in such a small fuel as the micro fuel sphere, the gradient of oxygen concentration in fuel scarcely occurs. Further, the micro fuel sphere prepared by the solution method is ensured the uniformity of grain size and can be prevented a local abnormal growth of grain.

The process for preparing a large-grain fuel according to the present invention consists of two steps of heat treatment as follows:

The first step is a heat treatment for growing the grain size, in which the micro fuel sphere having an advantage as described above is isothermally heated in a carbon dioxide stream. The diameter of grain is controlled by a temperature and time in this heat treatment step. The large-grain fuel sphere obtained by this step has a hyperstoichiometric composition and is not sufficient in density.

Therefore, as the second step, the final sintering is performed in a hydrogen stream for regulating O/U ratio and density so as to satisfy the fuel aspect.

EXAMPLE

The present invention will be more concretely explained with examples, but the present invention is not limited by the examples and is possible to be modified within the scope of technical thought of the present invention.

EXAMPLE 1

An ordinary micro fuel sphere was prepared by drying and sintering a particle of ammonium diuranate (ADU) prepared by dropping an aqueous solution prepared by adding a caking agent to an aqueous solution of uranyl nitrate into ammonia water (SNAM process—a typical preparation process of particle fuel developed in Italy). The micro fuel sphere obtained was heated at a heating rate of 500° C./h to the desired temperature in a carbon dioxide stream and was maintained at the highest temperature for 20 hours. Thereafter, the atmosphere gas was changed to hydrogen and after reducing for a few hours it was allowed to cool. As the result, the micro fuel sphere of approximately 5 $\mu$m in average grain size, which is a starting material before heat treatment, has grown to approximately 15, 60, 100 and 840 $\mu$m at the highest temperature of 1100°, 1200°, 1350° and 1400° C., respectively. It is possible by controlling the sintering temperature and time in the reducing process of the the final step to make the large-grained fuel sphere to sufficient high density.

EXAMPLE 2

As a process for preparing a pellet fuel for light water type power reactor, there is a spherical method of compressing a micro fuel sphere to a pellet, besides a powder compression method commercially used at the present time.

This example shows a process for preparing a large-grained pellet fuel by using a large-grained fuel sphere obtained by the present invention in the spherical method.

In the preparation of pellet fuel by the spherical method, generally a low density of fuel sphere of about 800° C. in sintering temperature is utilized. In order to obtain a large-grained fuel sphere in the present invention, the heat treating process for particle growth is conducted at a temperature exceeding 1000° C. However, fortunately, the fuel sphere does not increase in density by heat treatment in carbon dioxide stream. Therefore, for utilizing a large-grained fuel sphere obtained by the present invention, at the time of the final heat treatment process, that is, heat treatment in a reducing atmosphere aiming at the control of O/U ratio and density, it is well as the temperature is below 800° C. The low density large-grained fuel sphere thus obtained can be utilized in the preparation of sphereical fuel and so the preparation of large-grained pellet fuel for light water type power reactor becomes possible.

The effect of the present invention can be summarized as follows:

A large-grained micro fuel sphere can be easily prepared without using any additives.

When utilizing the fuel sphere in the preparation of a coated-particle fuel for high-temperature gas-cooled reactor, the effective diffusion length of FP in fuel nuclear can be lengthened and it becomes possible to reduce the amount of FP discharged.

And, by a sphere pack and spherical fuel for light-water type power reactor prepared by the large-grained micro fuel sphere obtained by the present invention, one means will be obtained for reducing the amount of FP discharged with the load-following operation and the high combustion degree expected in future.

What is claimed is:

1. A process for producing large-grained, low-density $UO_2$ micro-fuel spheres, said micro-fuel spheres having an average grain diameter of at least 5 $\mu$m, which comprises:
    (a) isothermally heating one or more $UO_2$ micro-fuel spheres in a stream consisting essentially of carbon dioxide for a time and at a temperature sufficient to produce grains having an increased average grain diameter of greater than 5 $\mu$m, without substantially increasing the density of said micro-fuel spheres; and then
    (b) sintering said produced grains, in the absence of a sintering additive, in a reducing gas stream for a time and at a temperature sufficient to regulate both the ratio of oxygen to uranium in the produced grains, and the density of the grains.

2. The process as claimed in claim 1, wherein said one or more $UO_2$ micro-fuel spheres are isothermally heated in said carbon dioxide stream at a temperature of at least about 1100° C., thereby forming grains having an average grain size of at least about 15 $\mu$m.

3. The process as claimed in claim 1, wherein said one or more $UO_2$ micro-fuel spheres are isothermally heated in said carbon dioxide stream at a temperature of at least about 1200° C., thereby forming grains having an average grain size of at least about 60 $\mu$m.

4. The process as claimed in claim 1, wherein said one or more $UO_2$ micro-fuel spheres are isothermally heated in said carbon dioxide stream at a temperature of at least about 1350° C., thereby forming grains having an average grain size of at least about 100 $\mu$m.

5. The process as claimed in claim 1, wherein said one or more $UO_2$ micro-fuel spheres are isothermally heated in said carbon dioxide stream at a temperature of at least about 1400° C., thereby forming grains having an average grain size of at least about 840 $\mu$m.

6. The process as claimed in claim 1, wherein said grains produced in step (a) are sintered in a hydrogen gas stream.

7. The process as claimed in claim 1, wherein said one or more $UO_2$ micro-fuel spheres are isothermally heated at a heating rate of about 500° C./hr. and then maintained at maximum temperature for about 20 hours.

8. The process as claimed in claim 1, wherein in step (b), said temperature sufficient to regulate both the ratio of oxygen to uranium in the produced grains and the density of the grains is less than about 800° C.

9. The process as claimed in claim 1, wherein said one or more $UO_2$ micro-fuel spheres, which are isothermally heated, are prepared by drying and sintering particles of ammonium, said ammonium diuranate being prepared by adding a caking agent to an aqueous solution of uranyl nitrate in ammonia water.

* * * * *

UNITED STATES PATENT AND TRADEMARK OFFICE
CERTIFICATE OF CORRECTION

PATENT NO. : 4,885,147
DATED : DECEMBER 5, 1989
INVENTOR(S) : Hirohiko MURAKAMI et al It is certified that error appears in the above-identified patent and that said Letters Patent is hereby corrected as shown below:

In Figure 1A, change "DIAMETER APPROX. $5\mu m$" to
-- GRAIN DIAMETER APPROX. $5\mu m$ --.

Column 3, line 15, change "the the final" to
-- the final --.

Column 3, line 19, change "light water" to
-- light-water --.

Column 3, line 44, change "light water" to
-- light-water --.

Column 4, line 54, change "particles of ammonium, said" to
-- particles of ammonium diuranate, said --.

Signed and Sealed this

Twenty-eighth Day of April, 1992

Attest:

HARRY F. MANBECK, JR.

*Attesting Officer*     *Commissioner of Patents and Trademarks*